W. A. TURBAYNE.
ELECTRICAL SYSTEM OF DISTRIBUTION.
APPLICATION FILED JAN. 26, 1909.
1,160,344.
Patented Nov. 16, 1915.
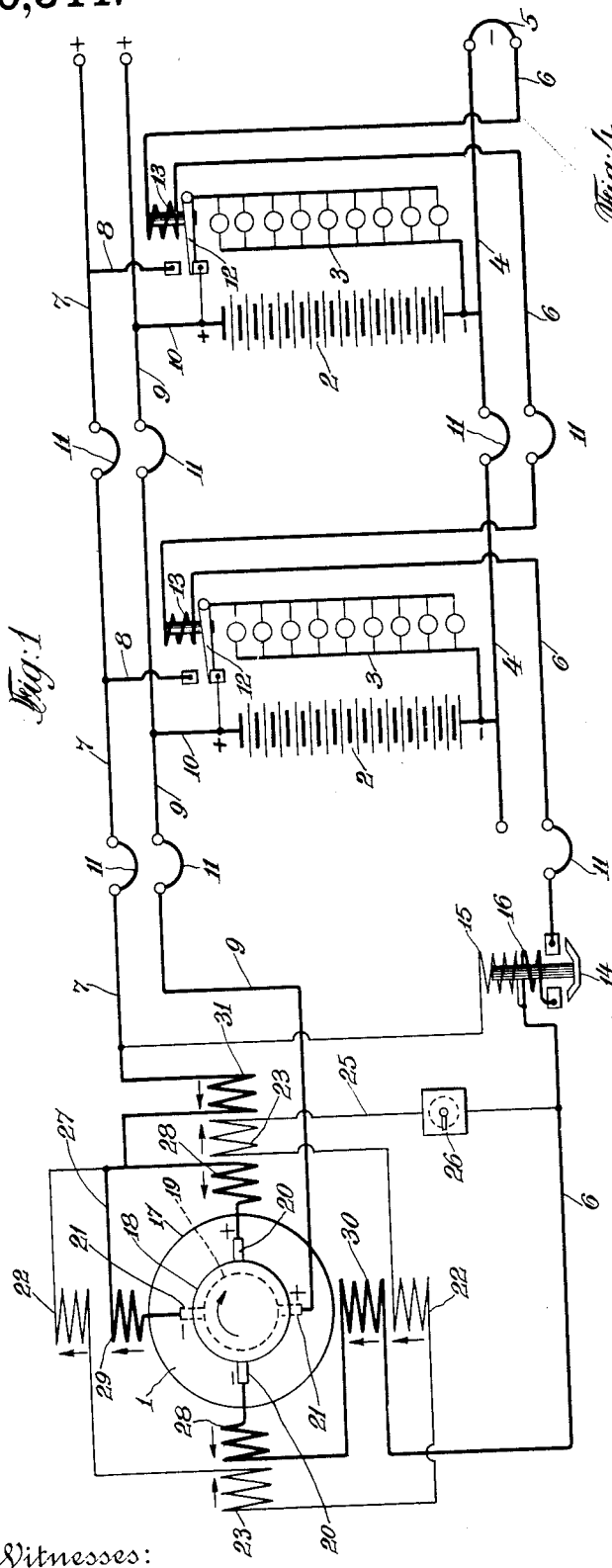
Witnesses:
W. A. Hutton
John O. Gempler
Inventor
William A. Turbayne
By his Attorneys
Kenyon & Kenyon

UNITED STATES PATENT OFFICE.

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

1,160,344.  Specification of Letters Patent.  Patented Nov. 16, 1915.

Application filed January 26, 1909.  Serial No. 474,269.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and is more especially designed in connection with systems in which a main generator is designed to feed a work circuit and storage battery and in which the storage battery is fed and charged at a separate or independent voltage from that at which the work circuit is fed.

One main object of the invention is to provide a generating means supplying such a system in which the operating and regulating features are such that two separate voltages are generated and one circuit supplied with one voltage and the other circuit supplied with the sum of the two voltages in an improved manner, and also at the same time armature reaction is eliminated and the generating means regulated so as to keep up the potential on the work circuit as the load is increased and yet the battery charging current is decreased if the work circuit load shall become too great so as not to overload the generating means.

Further objects, features and advantages will be more clearly apparent from the detailed description given below taken in connection with the accompanying drawing which forms a part of this specification.

In the drawing, Figure 1 represents diagrammatically a system embodying one form of my invention and Figs. 2, 3 and 4 are diagrams illustrating vectorially the arrangement of magnetomotive forces produced in the generator and the voltages due thereto.

Referring to Fig. 1, I have diagrammatically shown a train lighting system in which 1 represents a main generator which may be located on one unit of a train, such as for instance, the locomotive or the baggage car and which supplies batteries 2, 2 and work circuits 3, 3 on various other units or cars of the train. The negative terminal of the batteries and work circuits on the various units of the train are connected to a conductor 4, which at the end of the train, is connected by a loop 5 to a return conductor 6 which in turn is connected to the negative side of the generator. The conductors 4, 5 and 6 form as a whole a return loop conductor for the batteries and work circuits. The work circuits 3 which may consist of lamps or other translating devices are fed from a relatively low potential circuit 7 which extends throughout the length of the train and which may be connected to the individual work circuits 3 by means of conductors 8. The batteries are arranged to be charged from a relatively high potential conductor 9 which also extends throughout the various units of the train and which may be connected to the positive terminal of the various batteries by conductors 10. The divisions between the various train units are indicated by loop conductors 11 connected in series in the conductors or circuits 4, 6, 7 and 9.

12, 12 represent switches which are designed to connect the work circuit directly with the battery or with the feeding circuit 7 by means of conductors 8. These switches are operated by coils 13 in series in the conductor 6 in such a manner that when the current flows in the return conductor 6 the switches 12 are raised in order that the work circuits 3 may be connected directly to the feeding conductor 7 in order to be fed directly from the generator.

14 represents an automatic switch in the conductor 6 operated by a solenoid 15 connected across the circuits 6 and 7 to be responsive to voltage changes of the generator circuit feeding the work circuits. In starting up the system and the generator 1, when the voltage of the generator has reached the normal and sufficient value the solenoid or coil 15 operates the switch 14 to complete the circuit of conductor 6, thereby allowing the generator to furnish current to the batteries and work circuits. Immediately such action takes place the switches 12 are operated throwing the work circuits 3 across the feeding conductors 7 and 6, so that the work circuits will then be fed directly from the generator. Should the batteries furnish back current to the generator when being shut down this current pasing through the coil 16 in connection with the switch 14 counteracts the action of the coil 15, thereby releasing the switch so that the generator will be disconnected and no back current will be forced through it. When the generator 1 is being shut down its voltage decreases, thereby decreasing the action of the coil 15 and releasing the switch 14 whereupon current in conductor 6 and coil 13 is eliminated and the switches 12 are operated to connect the batteries directly to the work circuits.

The generator 1 is provided with a single magnet frame and a single armature core structure, which core structure may be represented by reference character 17. The armature core structure is provided with two separate and independent armature windings and two separate commutators therefor which may be represented by the circles 18 and 19. Brushes 20 are arranged to collect the current from the commutator 18 and brushes 21 are arranged to collect the current from the commutator 19. These brushes are arranged at 90 electrical degrees from each other and in the drawing only a two-pole machine is shown with the brushes arranged at right angles to each other.

The machine is provided with field coils 22 which are wound to produce an electromotive force or difference of potential at the brushes 20, and with field coils 23 which are wound to produce a difference of potential at the brushes 21. These field coils 22 and 23 are connected in series with each other and in a shunt circuit 25 across the feeding conductors 6 and 7. A rheostat 26 is inserted in the conductor 25 for the purpose of adjustment. The conductors 6 and 7, which may be considered to form a consumption circuit, are connected to be fed from the brushes 20 and consequently the voltage applied thereto will be substantially the difference of potential at the brushes 20, which difference of potential is produced by the field coils 22. The circuit through the brushes 21 is connected in series with the circuit through the brushes 20 by means of a conductor 27 in such a way that the potential between the negative brush 20 and the positive brush 21 is substantially equal to the sum of the voltages between the brushes 20 and brushes 21.

From the above it will be apparent that the potential across the consumption circuits 6, 7 is substantially the potential across the brushes 20, while the potential across the conductors 6, 9, which may be termed a charging circuit, is substantially the sum of the potentials across the brushes 20, 20 and the brushes 21, 21. I adjust the various windings such that the potential initially produced across the brushes 20, 20 is substantially 60 volts, while that initially produced across the brushes 21, 21 is substantially 20 volts, so that the total voltage applied to the charging circuit 6, 9 will be substantially 80 volts, while the voltage across the consumption circuit 6, 7 will be substantially 60 volts. In such a machine, however, in which two values of voltage are furnished at 90 degrees from one another vectorially and in which the voltages result from magnetomotive forces substantially 90 electrical degrees apart, it is necessary in order to get good results to provide means for cutting down or compensating for the armature reaction of the machine. To provide for this I place field coils 28, 28 in series with the conductors 6, 7, 9 and 27, such that these coils are subjected to the total current of the generator whether the flow of current is furnished wholly to the batteries or to the work circuits or part to each. These windings 28, 28 are arranged to off-set the effect of the armature current between the brushes 20, 20 and to thereby compensate for the armature reaction thereof and prevent this armature current from reacting on the horizontal flux produced by the shunt coils 23, 23. In a like manner field windings 29 are provided in series with the brushes 21, 21 to nullify the tendency to the production of a vertical flux by the current between the brushes 21, 21, which current flows to the charging circuit 6, 9, for the purposes of charging the batteries.

A field coil 30 is provided in series with the common return conductor 6, which coil acts upon the vertical flux, and, therefore, the voltage changes which it effects are felt in both the consumption and charging circuits. This coil 30 is, therefore, arranged to compound the machine to compensate for line drop with increased load.

A field coil 31 is provided in series in the conductor 7 and arranged to effect the horizontal flux. This coil is subjected only to variations in the current of the consumption circuit and only effects the magnetomotive force which produces the difference of potential between the brushes 21, 21. The coil 31 is so wound that it opposes the magnetomotive force set up by the shunt coils 23, and, therefore, upon an increased load being thrown upon the consumption circuit 6, 7 it will tend to cut down the horizontal flux component and thereby cut down the voltage applied to the charging circuit 6, 9. It will thus be apparent that as the work circuit load on the system increases abnormally the charging circuit voltage is decreased, thereby decreasing the load on the charging circuit so that a tendency is had to keep the total load on the generator constant. If the increase in load on the work circuits proceeds far enough the coil 31 may entirely wipe out the flux component produced by shunt coil 23 and produce a flux component in the opposite direction such that the charging circuit voltage will become less than the work circuit voltage whereby the batteries 2, 2 will discharge current and help take the increase load upon the system. The direction of the various magnetomotive forces produced by the field coils 22, 22, 23, 23, 28, 28, 29, 30 and 31 is indicated by the arrows adjacent thereto.

Referring to Fig. 2 the diagram illustrates the open circuit condition when no armature current is flowing in the generator. The various circles indicate various values of voltages as shown. O—A and O—C represents respectively the values of horizontal and vertical flux components. O—C will produce at the brushes 20, 20 in quadrature therewith the voltage O—B which I have assumed as 60 volts. The horizontal flux O—A will produce at the vertical brushes 21, 21 in quadrature therewith voltage O—D which I have assumed to be 20 volts and these two voltages added together will give the sum of substantially 80 volts across the boosted feeders or charging circuit, 6, 9.

Referring to Fig. 3, this diagram represents conditions when there is full load on the work circuits and there is no battery current due to the cutting down or wiping out of the voltage at the brushes 21, 21. In this diagram O—A and O—C represent as before the magnetomotive forces due to the shunt windings E. A—E represents the magnetizing effect of the main armature current and O—F the opposing effect of coils 28, 28. It will be noted that these two effects are equal and opposite in direction. F—G represents the magnetizing effect due to coil 31, which is equal and opposite in direction to the effect of shunt coils 23, so that under this condition the sum of the horizontal magnetizing force is zero, leaving only the vertical flux O—C effective in producing a voltage in the generator, which voltage will be designated by O—B across the main brushes and which will be substantially 60 volts.

Referring to Fig. 4, this diagram represents the condition when there is full load on the batteries and no work circuit current. Here again the same values of the excitation due to shunt coils 22, 22, 23, 23 is represented by O—A and O—C. A—E and O—F will, as in the previous instance, offset each other so that the flux values due to the shunt excitation of coils 22, 22, 23, 23 will remain for producing the 60 volts O—B across the main brushes and 20 volts O—D across the boosting brushes 21, 21, giving together 80 bolts available across the charging circuit, 6, 9. The battery current flowing through the vertical brushes 21, 21 through the boosting winding causes a magnetomotive force represented by O—H, which, however, is nullified by the boosting magnetomotive force C—J produced by the compensating coil 29.

From the above it will be apparent that it is possible to control the value of the boosting voltage without influencing the voltage across the main brushes. To compensate for the voltage drop in the line or armature winding, either component or flux may be controlled by adjustment of the windings in such a manner that either of the feeders 7 or 9 may be given a rising voltage characteristic sufficient to compensate for line drop therein, while a rising voltage effective across the main brushes will be given by the action of the coil 30 sufficient to compensate for the line drop in the return feeder which carries the total load from the rear end of the train.

With such a system and arrangement it is possible to produce substantially all the actions that are given to other train lighting systems where various independent and separate dynamo-electric machines are used to produce the boosting voltage and to regulate the system as above described for variations in load on the consumption and charging circuits. It will also be apparent that if sufficient cars are added so that the work circuit load will demand current greater than the load desired to be maintained on the generator the field coil 31 will predominate and produce a horizontal flux component in a direction to reverse the polarity of the boosting brushes 21, 21, thereby causing the batteries to discharge into the work circuits and carry the extra load.

My improvements are especially advantageous since various features of construction and regulation are all produced in a single machine, so that economy of space as well as of economy and efficiency of operation and construction are obtained.

Although I have described my improvements in great detail I do not desire to be limited by such details, but Having fully and clearly shown and described my invention what I claim as new and desire to secure by Letters Patent is:

1. In an electrical system of distribution, a generator provided with a single armature core structure, a commutator and brushes thereon for supplying one voltage, another commutator and brushes thereon for supplying another voltage, a circuit fed from one set of said brushes and a circuit fed from both sets of brushes to supply a different voltage from that supplied by said first mentioned circuit the voltage produced at each set of brushes being derived from independent field excitations.

2. In an electrical system of distribution, a generator provided with a single armature core structure, a set of brushes thereon for supplying one electromotive force, a set of brushes thereon for supplying a separate electromotive force, an independent armature winding for each set of brushes, field coils for producing independent field excitation for said armature windings, and means for connecting said windings in series, a circuit connected to be fed from one armature winding and a circuit connected to be fed from both of said armature windings in series.

3. In an electrical system of distribution, the combination of a generator provided with an armature core structure having two windings for producing separate voltages and with separate field coils for said windings, means for connecting said windings in series, a circuit connected to be fed from one of said windings alone and a circuit connected to be fed from both of said windings in series.

4. In combination, a generator provided with an armature structure having two sets of armature windings and two sets of brushes therefor at substantially ninety electrical degrees from each other, said armature structure being constructed to produce separate voltages at each set of brushes, a circuit connected and arranged to be supplied with current produced by one voltage from said generator and another circuit connected and arranged to be supplied with current produced by a different voltage from said generator.

5. In an electrical system of distribution, a generator having suitable brushes two sets of armature windings constructed to produce two separate voltages at brushes substantially ninety electrical degrees from each other, and having separate field windings for each voltage, a circuit connected to be supplied with current produced by one of said voltages and a separate circuit connected to be supplied with current produced by a different voltage from said generator.

6. In an electrical system of distribution, a generator having suitable brushes two windings constructed to produce two separate voltages at brushes substantially ninety electrical degrees from one another and having separate field windings for producing each voltage, means for arranging said first two windings in series, a circuit connected to be fed with current produced by one of said voltages and a circuit arranged to be supplied with current produced by the sum of said voltages.

7. In an electrical system of distribution, a generator having suitable brushes and constructed to produce two separate voltages at brushes substantially ninety electrical degrees from one another and having separate field windings for producing each voltage, windings for cutting down the armature reaction of the generator, a circuit connected to be supplied with current produced by one voltage from the generator and a circuit connected and arranged to be supplied with current produced by a different voltage from the generator.

8. In an electrical system of distribution, a generator having suitable brushes two windings constructed to produce two separate voltages at brushes substantially ninety electrical degrees from one another and having separate field windings for producing each voltage, means for cutting down the armature reaction of the dynamo, means for arranging said first two windings in series, a circuit connected to be supplied with current produced by one of said voltages and a circuit connected to be supplied with current produced by the sum of said voltages.

9. In an electrical system of distribution, a generator having suitable brushes and constructed to produce two separate voltages at brushes substantially ninety electrical degrees from one another and having separate field windings for producing each voltage, means for cutting down the armature reaction of the generator, a work circuit connected to be supplied with current produced by one voltage from the generator and a battery connected to be charged by current produced by another voltage from the generator.

10. In an electrical system of distribution, a generator having suitable brushes two windings constructed to produce two separate voltages at brushes substantially ninety electrical degrees from one another and having separate field windings for producing each voltage, windings for cutting down the armature reaction of the generator, means for connecting said first two windings in series, a plurality of train units each carrying a battery and work circuit, conductors for connecting the work circuits to be supplied with current produced by one of said voltages and conductors for connecting the batteries to be charged with current produced by the sum of said voltages.

11. In an electrical system of distribution, two circuits, a generator therefor constructed to develop two separate voltages in its armature, brushes for each voltage electrically spaced from one another, whereby two separate voltages may be applied to said circuits, and means for cutting down the armature reaction in said generator.

12. In an electrical system of distribution, two circuits, a generator therefor constructed to develop two separate voltages in its armature, a set of brushes for each voltage, said sets being spaced apart substantially ninety electrical degrees, whereby two separate voltages may be applied to said circuits, and windings on the generator fields for cutting down armature reaction.

13. In an electrical system of distribution, a work circuit, a battery and a charging circuit therefor, a generator in operative relation therewith constructed to develop two separate voltages in its armature whereby two different voltages may be applied to said circuits, field windings for producing independent fields electrically displaced for producing said voltages, connections from the generator to the circuits and windings on the generator fields for cutting down armature reaction.

14. In an electrical system of distribution, a work circuit, a battery and its circuit, a common return conductor for said circuits, a generator in operative relation therewith constructed to develop two separate voltages whereby a separate voltage may be applied to each of said circuits, and a coil in said common return conductor for compounding said generator.

15. In an electrical system of distribution, a generator having two armature windings arranged to produce separate voltages, two sets of brushes therefor at substantially ninety electrical degrees from each other, separate field windings for producing said voltages, means for connecting said brushes in series, a circuit fed from one set of brushes and a circuit fed from said brushes connected in series.

16. In an electrical system of distribution, a generator having two armature windings arranged to produce separate voltages, two sets of brushes therefor at substantially ninety electrical degrees from each other, separate field windings for producing said voltages, means for connecting said brushes in series, means for cutting down armature reaction in said generator, a work circuit fed from one set of brushes and a battery and its circuit connected to be fed from said sets of brushes in series.

17. In an electrical system of distribution, a generator having two armature windings arranged to produce separate voltages, two sets of brushes therefor at substantially ninety electrical degrees fro meach other, separate field windings for producing said voltages, means for connecting said brushes in series, means for cutting down armature reaction in said generator, a work circuit fed from one set of brushes, a battery and its circuit connected to be fed by said sets of brushes in series and a coil responsive to changes in work circuit current for cutting down the difference in said voltages as the load on the work circuit increases.

18. In an electrical system of distribution, a charging circuit and batteries therein, a work circuit, a generator in operative relation thereto, said generator having two armature windings arranged to produce different voltages, one winding connected to the work circuit, means for connecting said windings in series to the charging circuit, coils in series with said windings for cutting down armature reaction, a coil in series with the work circuit for compensating for line drop and a coil responsive to changes in the work circuit current for cutting down the difference in voltage between said circuits.

19. In a train lighting system, a generator provided with two sets of field poles, field windings arranged to produce in each set a separate magneto-motive force, means for controlling the comparative value of said magneto-motive forces, an armature in operative relation with the field poles provided with two sets of brushes operatively arranged with respect to said magneto-motive forces, in combination with appropriate circuits, translating devices and storage batteries, and switches adapted to make connection between translating devices, batteries and brushes whereby the translating devices may be operated from one potential when the batteries are charged from another.

In testimony whereof, I have signed my name to this specification, in the presence of two subscribing witnesses.

WILLIAM A. TURBAYNE.

Witnesses:
 RAYMOND HUMMELL,
 W. H. PATTENDEN.

---

Correction in Letters Patent No. 1,160,344.

It is hereby certified that in Letters Patent No. 1,160,344, granted November 16, 1915, upon the application of William A. Turbayne, of Lancaster, New York, for an improvement in "Electrical Systems of Distribution," an error appears in the printed specification requiring correction as follows: Page 3, line 36, for the word "force" read *forces;* and that the said Letters Patent should be read with this correction therein that the same may conform to the record of the case in the Patent Office.

Signed and sealed this 18th day of January, A. D., 1916.

[SEAL.]

J. T. NEWTON,

*Acting Commissioner of Patents.*

Cl. 171—313.